US010802879B2

(12) United States Patent
Chou et al.

(10) Patent No.: US 10,802,879 B2
(45) Date of Patent: Oct. 13, 2020

(54) METHOD AND DEVICE FOR DYNAMICALLY ASSIGNING TASK AND PROVIDING RESOURCES AND SYSTEM THEREOF (71) Applicant: Acer Incorporated, New Taipei (TW)

(72) Inventors: Szu-Ting Chou, New Taipei (TW); Lee-Yu Lu, New Taipei (TW)

(73) Assignee: ALTOS COMPUTING INC., New Taipei (TW)

( * ) Notice: Subject to any disclaimer, the term of this patent is extended or adjusted under 35 U.S.C. 154(b) by 141 days.

(21) Appl. No.: 16/105,217

(22) Filed: Aug. 20, 2018

(65) Prior Publication Data
US 2019/0155652 A1 May 23, 2019

(30) Foreign Application Priority Data
Nov. 20, 2017 (TW) .............................. 106140085 A (51) Int. Cl.
G06F 9/50 (2006.01)
G06F 9/48 (2006.01)

(52) U.S. Cl.
CPC .......... G06F 9/5011 (2013.01); G06F 9/4818 (2013.01); G06F 9/4881 (2013.01); G06F 9/505 (2013.01); G06F 9/5027 (2013.01)

(58) Field of Classification Search
CPC ...... G06F 9/5011; G06F 9/5027; G06F 9/505; G06F 9/4881; G06F 9/4818
See application file for complete search history.

(56) References Cited

U.S. PATENT DOCUMENTS

2012/0284410 A1* 11/2012 Dudek .................. G06F 9/5027
709/226
2018/0276044 A1* 9/2018 Fong ..................... G06F 9/5044

FOREIGN PATENT DOCUMENTS

| CN | 104869654 A | 8/2015 |
| CN | 105426245 A | 3/2016 |
| TW | 201232416 A | 8/2012 |
| TW | 201701152 A | 1/2017 |

OTHER PUBLICATIONS

Chinese language office action dated Jul. 18, 2018, issued in applictaion No. TW 106140085.
European Search Report dated Mar. 29, 2019, issued in application No. EP 18191920.0.
Bessis, N., et al.; "Using a Novel Message-Exchanging Optimization(Meo) Model to Reduce Energy Consumption in Distributed Systems;" Simulation Modelling Practice and Theory; 2013; pp. 1-17.

* cited by examiner

Primary Examiner — Sisley N Kim
(74) Attorney, Agent, or Firm — McClure, Qualey & Rodack, LLP (57) ABSTRACT A method for dynamically assigning task is provided. The method includes: broadcasting work requirements corresponding to the task to a plurality of resource provisioning devices; determining whether an application request transmitted from one of the resource provisioning devices has been received; and assigning the task to a first resource provisioning device of the resource provisioning devices when receiving the application request transmitted from the first resource provisioning device.

6 Claims, 6 Drawing Sheets

METHOD AND DEVICE FOR DYNAMICALLY ASSIGNING TASK AND PROVIDING RESOURCES AND SYSTEM THEREOF

CROSS REFERENCE TO RELATED APPLICATIONS

This application claims priority from Taiwan Patent Application No. 106140085, filed on Nov. 20, 2017, the disclosure of which is incorporated herein by reference in their entirety.

BACKGROUND OF THE INVENTION

Field of the Invention

Aspects of the present disclosure relate generally to the field of communication networks, and more particularly, to a method and a device for dynamically assigning a task and providing resources and a system for dynamically assigning a task thereof.

Description of the Related Art

Digital computer networks, such as the Internet, are now used extensively in many aspects of commerce, education, research and entertainment. Because of the need to handle high volumes of traffic, many Internet sites are designed using several, or many, servers in a multi-tiered system.

In a multi-tiered system, a master server or workstation selected from multiple servers or workstations manages the resources and working status of multiple slave servers or workstations simultaneously. The master server then selects the best server to assign new tasks to the best server for execution.

However, the approaches used in the prior art often require additional hardware, software and database redundancy that is complex, consumes resources, and requires time-consuming installation, configuration and operator training. The prior-art systems are not easily scalable and have not achieved the desired reliability, performance improvement, security, speed, or efficiency.

Therefore, it is necessary to provide a method and a device for dynamically assigning a task and providing resources and a system for dynamically assigning a task thereof, so that the master server does not need to monitor the condition of each server one-by-one, and can automatically assign tasks to the servers. The system load can be reduced and the efficiency of work assignments can be increased.

BRIEF SUMMARY OF THE INVENTION

The following summary is illustrative only and is not intended to be limiting in any way. That is, the following summary is provided to introduce concepts, highlights, benefits, and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

A method and a device for dynamically assigning a task and providing resources and a system for dynamically assigning a task thereof are provided in the disclosure.

In a preferred embodiment, the disclosure is directed to a method for dynamically assigning a task. The method comprises: broadcasting work requirements corresponding to the task to a plurality of resource provisioning devices; determining whether an application request transmitted from one of the resource provisioning devices has been received; and assigning the task to a first resource provisioning device of the resource provisioning devices when receiving the application request transmitted from the first resource provisioning device In a preferred embodiment, the disclosure is directed to a device for dynamically assigning a task. The device comprises a processing unit and a memory operatively coupled to the processing unit. The processing unit is configured to execute a program code stored in the memory to: broadcast work requirements corresponding to the task to a plurality of resource provisioning devices; determine whether an application request transmitted from one of the resource provisioning devices has been received; and assign the task to a first resource provisioning device of the resource provisioning devices when receiving the application request transmitted from the first resource provisioning device.

In a preferred embodiment, the disclosure is directed to a method for dynamically providing resources. The method is used in a device, and comprises: receiving work requirements corresponding to a task from a resource-management device; determining whether an idle resource of the device meets the work requirements according to the work requirements; and transmitting an application request to the resource-management device when the idle resource of the device meets the work requirements.

In a preferred embodiment, the disclosure is directed to a device for dynamically providing resources. The device comprises a processing unit and a memory operatively coupled to the processing unit. The processing unit is configured to execute a program code stored in the memory to: receive work requirements corresponding to a task from a resource-management device; determine whether an idle resource of the device meets the work requirements; and transmit an application request to the resource-management device when the idle resource of the device meets the work requirements.

In a preferred embodiment, the disclosure is directed to a method for dynamically assigning a task. The method is used in a system that includes a resource-management device and a plurality of resource provisioning devices. The method comprises: broadcasting, by the resource-management device, work requirements corresponding to the task to the plurality of resource provisioning devices; determining, by each of the resource provisioning devices, whether an idle resource of the respective resource provisioning device meets the work requirements according to the work requirements; determining, by the resource-management device, whether the resource-management device receives an application request transmitted from one of the resource provisioning devices; and assigning, by the resource-management device, the task to a first resource provisioning device of the resource provisioning devices when receiving the application request transmitted from the first resource provisioning device.

In a preferred embodiment, the disclosure is directed to a system for dynamically assigning a task. The system comprises a resource-management device and a plurality of resource provisioning devices connected to the resource-management device. The resource-management device broadcasts work requirements corresponding to the task to the resource provisioning devices. Each of the resource provisioning devices determines whether an idle resource of the respective resource provisioning device meet the work requirements according to the work requirements. The resource-management device determines whether the resource-management device has received an application request transmitted from one of the resource provisioning devices. The resource-management device assigns the task to a first resource provisioning device of the resource provisioning devices when receiving the application request transmitted from the first resource provisioning device, wherein the application request is transmitted when the first resource provisioning device determines that the idle resource of the first resource provisioning device meets the work requirements according to the work requirements.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION OF THE INVENTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

Figure 1:
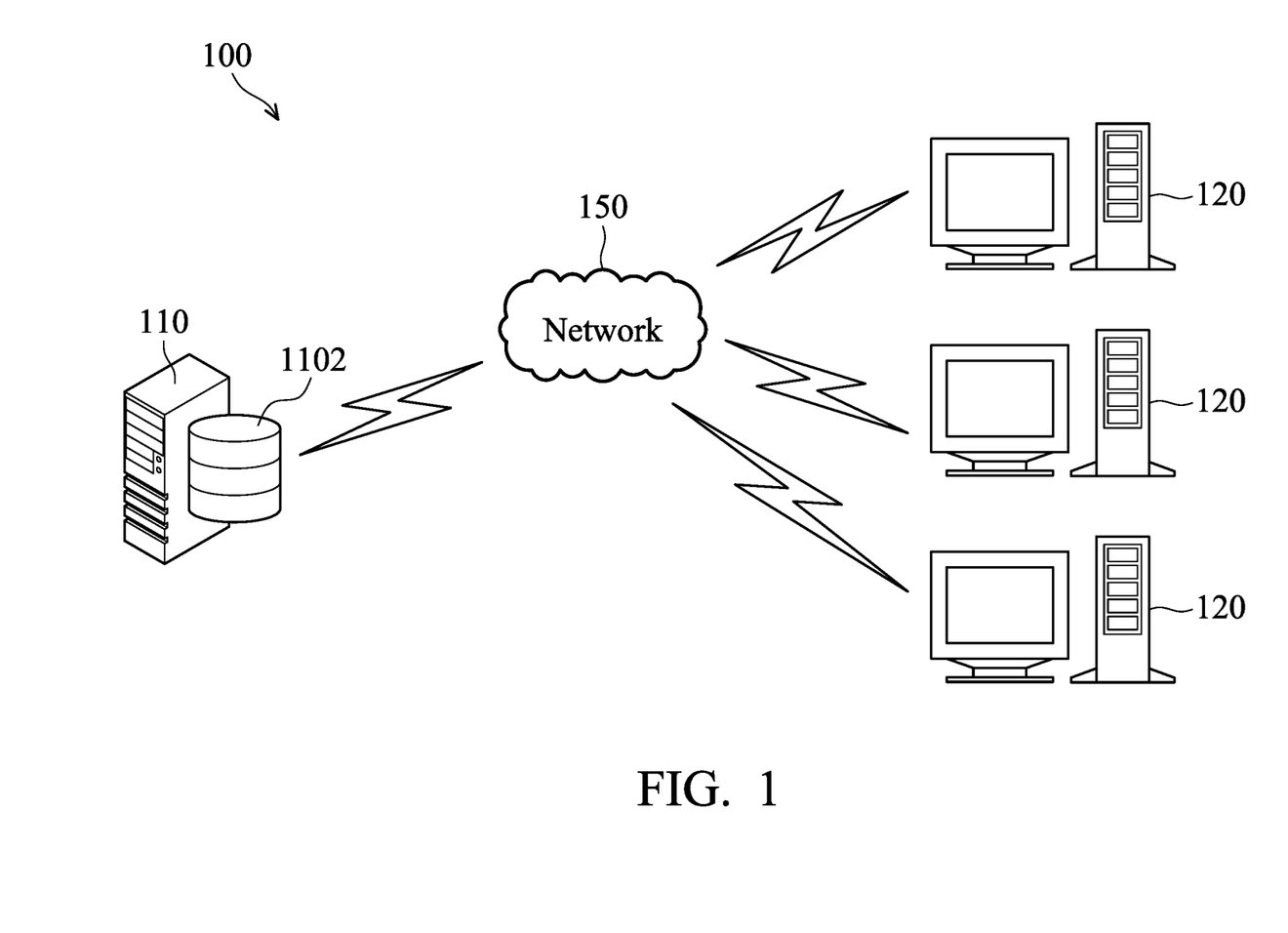
FIG. 1 shows a schematic diagram of a system for dynamically assigning a task in accordance with one embodiment of the present disclosure.

FIG. 1 shows a schematic diagram of a system 100 for dynamically assigning a task in accordance with one embodiment of the present disclosure. As shown in FIG. 1, the system 100 may comprise a resource-management device 110 and a plurality of resource provisioning devices 120.

The resource-management device 110 and the plurality of resource provisioning devices 120 may be any other electronic device, such as a computer, Internet-enabled mobile telephone, and/or server, capable of communicating via a network (e.g., the network 150 described in FIG. 1) and/or displaying web pages or other types of electronic documents. It should be noted that although this example uses three resource provisioning devices 120 as depicted in FIG. 1, it should not be limited in the disclosure.

In the embodiment, the system 100 may also include a network 150. The network 150 may be any type of network familiar to those skilled in the art provided it can support data communications using any of a variety of commercially-available protocols, including without limitation TCP/IP and so on.

Merely by way of example, the network 150 may be a local area network (LAN), such as an Ethernet network; a virtual network, including without limitation a virtual private network (VPN); the Internet; a wireless network; or any combination of these and other networks.

The resource-management device 110 can communicate with the resource provisioning devices 1200 via the network 150. The resource-management device 110 can allow a user to upload a task and can assign the task to the resource provisioning devices 120. In addition, the resource-management device 110 can maintain a database 1102 that can record information such as tasks uploaded by each user.

Figure 2:
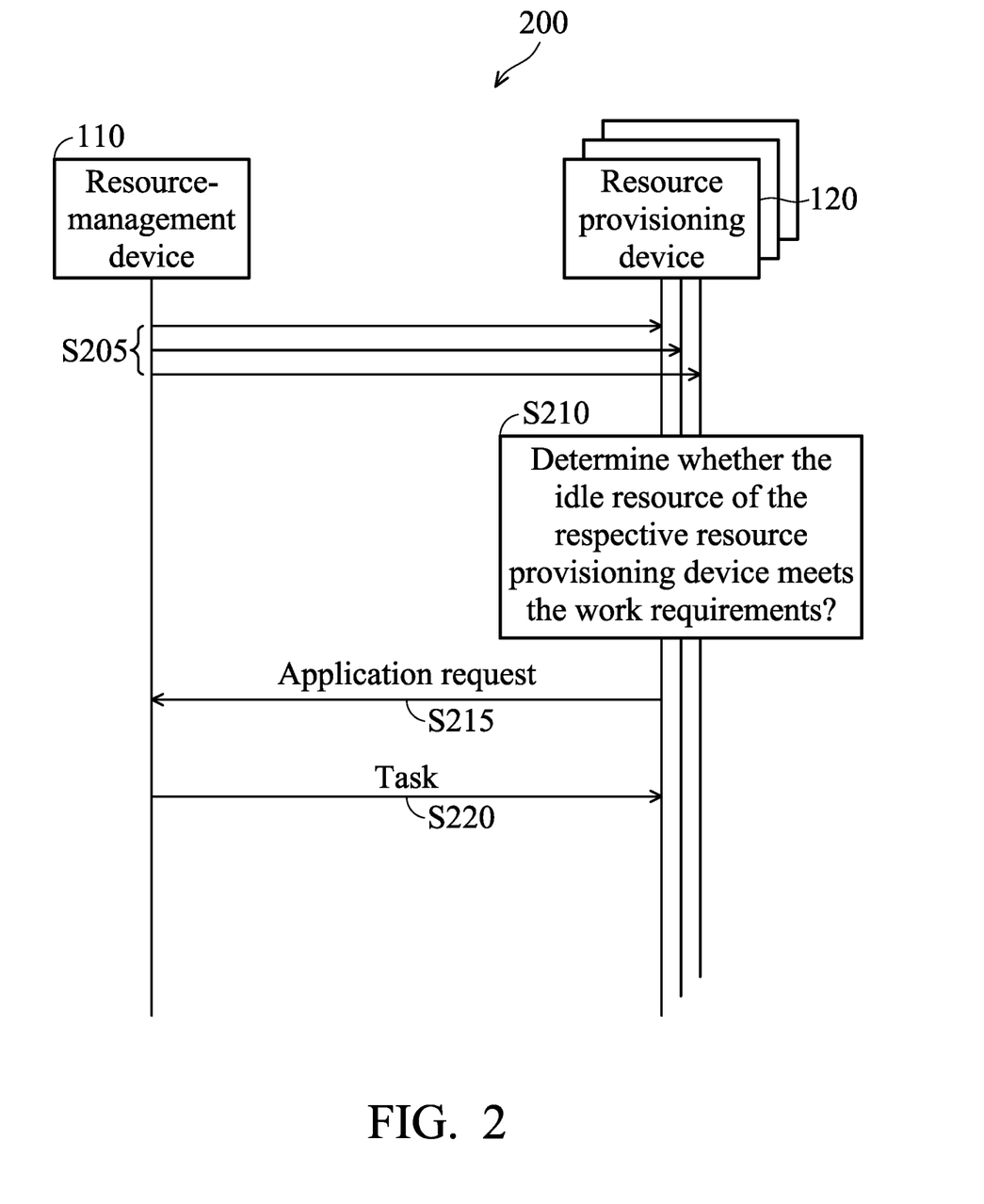
FIG. 2 is a message flow of a process for dynamically assigning a task according to an embodiment of the disclosure.

FIG. 2 is a message flow 200 of a process for dynamically assigning a task according to an embodiment of the disclosure, which illustrates how the resource-management device 110 assigns a task to the resource provisioning devices 120 in FIG. 1.

Before the process begins, the resource-management device may receive a task uploaded by the user. In step S205, the resource-management device 110 may broadcast the work requirements corresponding to the task to the resource provisioning devices 120 after receiving the task uploaded by the user, wherein the work requirements corresponding to the task may at least include the number of central processing units (CPUs), affinity between the CPU and compute accelerator, number of compute accelerators, topology of compute accelerators, storage capacity, memory capacity, and task priority. In an embodiment, the task priority corresponding to the task may be assigned by the user or by the resource-management device 110.

After receiving the work requirements, in step S210, each of the resource provisioning devices 120 determines whether the idle resource of the respective resource provisioning device 120 meets the work requirements according to the work requirements. When each of the resource provisioning devices 120 determines that the idle resource of the respective resource provisioning device 120 meets the work requirements, each of the resource provisioning devices 120 transmits an application request the resource-management device 110.

In the embodiment, it is assumed that a first resource provisioning device of the resource provisioning devices first transmits an application request to the resource-management device 110. In step S215, the resource-management device 110 receives the application request transmitted from the first resource provisioning device. In step S220, the resource-management device 110 assigns the task to the first resource provisioning device and ignores the application requests received from the other resource provisioning devices.

Figure 3:
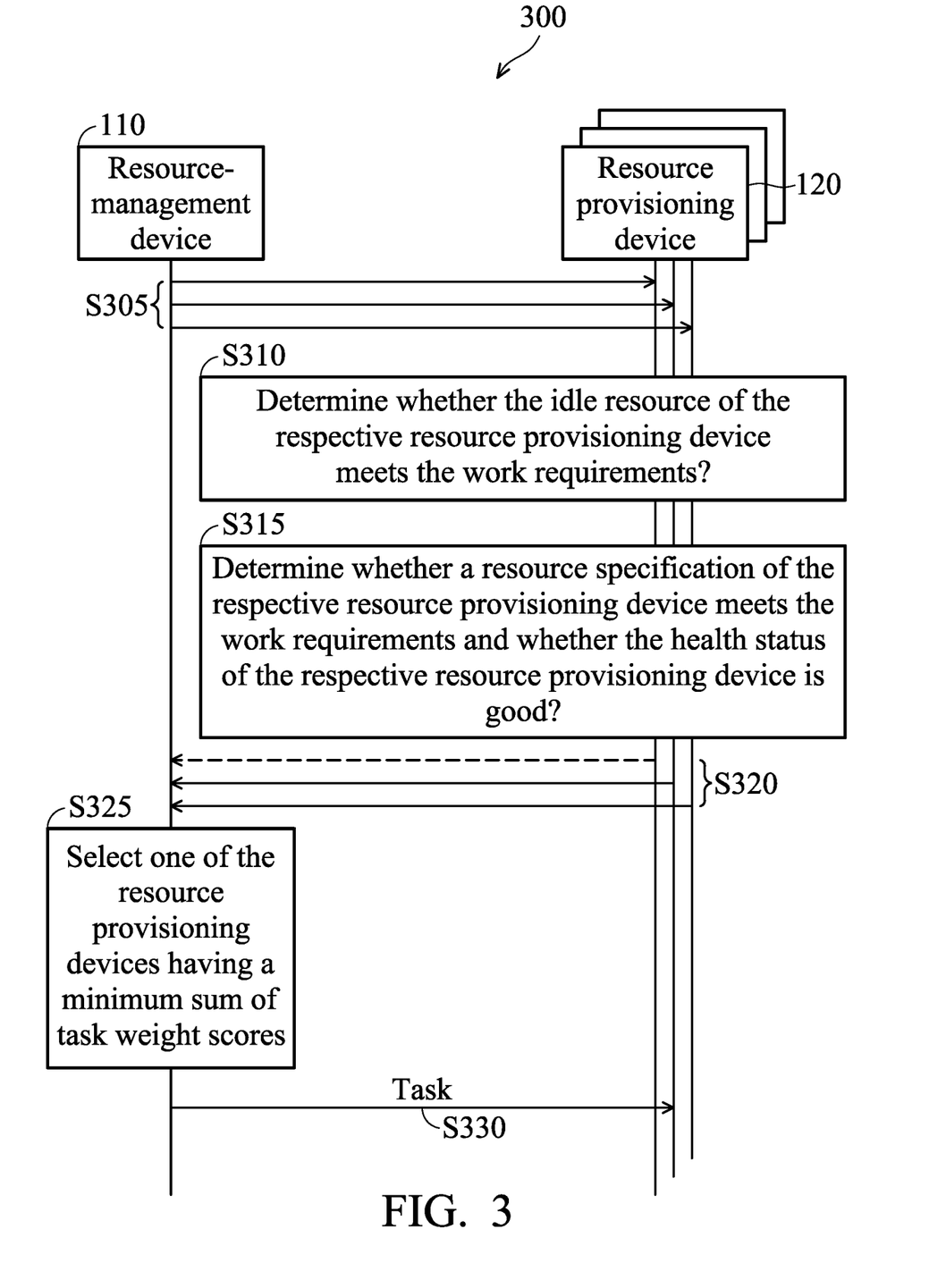
FIG. 3 is a message flow of a process for dynamically assigning a task according to an embodiment of the disclosure.

FIG. 3 is a message flow 300 of a process for dynamically assigning a task according to an embodiment of the disclosure, which illustrates how the resource-management device 110 assigns a task to the resource provisioning devices 120 in FIG. 1.

Before the process begins, the resource-management device may receive a task uploaded by the user. In step S305, the resource-management device 110 may broadcast the work requirements corresponding to the task to the resource provisioning devices 120 after receiving the task uploaded by the user, wherein the work requirements corresponding to the task may at least include the number of central processing units (CPUs), affinity between the CPU and a compute accelerator, number of compute accelerators, topology of compute accelerators, storage capacity, memory capacity, and task priority. In an embodiment, the task priority corresponding to the task may be assigned by the user or by the resource-management device 110.

In step S310, each of the resource provisioning devices 120 determines whether the idle resource of the respective resource provisioning device 120 meets the work requirements according to the work requirements after receiving the work requirements. In the embodiment, it is assumed that the idle resource of the respective resource provisioning device 120 does not meet the work requirements.

In step S315, each of the resource provisioning devices 120 determines whether a resource specification of the respective resource provisioning device meets the work requirements and whether the health status of the respective resource provisioning device is good. Specifically, the resource specification refers to a resource of the resource provisioning device in cases where no task is being executed in the resource provisioning device. In other words, the resource specification of the resource provisioning device does not meet the work requirements: that is, the resource provisioning device still cannot meet the work requirements when no task is being executed in the resource provisioning device. For example, the number of CPUs is insufficient, and the storage capacity is insufficient, and so on. The health status is a parameter that represents the performance and/or status of the resource provisioning device. In another example, in one embodiment, the resource provisioning device may measure the temperature of the resource provisioning device, the lifespan of the resource provisioning device, voltage supply status, or any other suitable parameter. When the parameters do not satisfy at least one parameter standard preset by the resource provisioning device, the resource provisioning device determines that the health status is not good.

When a resource specification of a second resource provisioning device of the resource provisioning device 120 meets the work requirements and the health status is good, the second resource provisioning device obtains the task weight score of each task currently being executed in the second resource provisioning device, and adds the task weight scores to obtain the sum of task weight scores. The task weight score of each task is expressed as follows:

$$\text{task weight score} = \text{priority} \times \text{amount of data},$$

wherein the priority of each task is assigned by the user or the resource-management device. The greater the value of the priority, and the greater the priority given to the task. The amount of data is the amount of data used in each task executed by the second resource provisioning device, wherein a unit of the amount of data may be Gigabytes (GB). In step S320, the second resource provisioning device transmits the sum of task weight scores of the second resource provisioning device to the resource-management device 110.

Similarly, when a resource specification of a third resource provisioning device of the resource provisioning devices 120 meets the work requirements and the health status is good, in step S320, the third resource provisioning device transmits the sum of task weight scores of the third resource provisioning device to the resource-management device 110. The details are same as the second resource provisioning device, so details related to the third resource provisioning device will be omitted.

The following will explain how the second resource provisioning device and the third resource provisioning device obtain the sum of the respective task weight scores. Tables 1 and 2 show that the tasks executed in the second resource provisioning device and the third resource provisioning device, respectively.

TABLE 1

| Name | Priority | Amount of data (GB) | Task weight score |
|---|---|---|---|
| Task C | 1 | 300 | 300 |
| Task D | 3 | 100 | 300 |
| Sum of task weight scores of the second resource provisioning device | | | 600 |

TABLE 2

| Name | Priority | Amount of data (GB) | Task weight score |
|---|---|---|---|
| Task A | 5 | 100 | 500 |
| Task B | 3 | 200 | 600 |
| Sum of task weight scores of the third resource provisioning device | | | 1100 |

As shown in Table 1 and Table 2, the sum of task weight scores of the second resource provisioning device is 600, and the sum of the task weight scores of the third resource provisioning device is 1100. Therefore, in step S320, the second resource provisioning device transmits the sum of task weight scores of the second resource provisioning device, 600, to the resource-management device 110, and the third resource provisioning device transmits the sum of task weight scores of the third resource provisioning device, 1100, to the resource-management device 110.

After the resource-management device 110 receives the sums of the task weight scores transmitted by the second and third resource provisioning devices, in step S325, the resource-management device 110 selects one of the resource provisioning devices having a minimum sum of task weight scores. In the embodiment, the one of the resource provisioning devices having the minimum sum of task weight scores is the second resource provisioning device. Therefore, in step S330, the resource-management device 110 assigns the task to the second resource provisioning device.

In the embodiment, when the resource specification of the first resource provisioning device of the resource provisioning devices 120 does not meet the work requirements or the health status is not good, in step S320, the first resource provisioning device reports status information to the resource-management device 110 (indicated by a dotted line), wherein the status information is used to notify the resource-management device 110 that the resource specification of the resource provisioning device 120 does not meet the work requirements or the health status of the resource provisioning device 120 is not good, so that the resource-management device 110 can track and maintain the status of the resource provisioning device 120.

Figure 4:
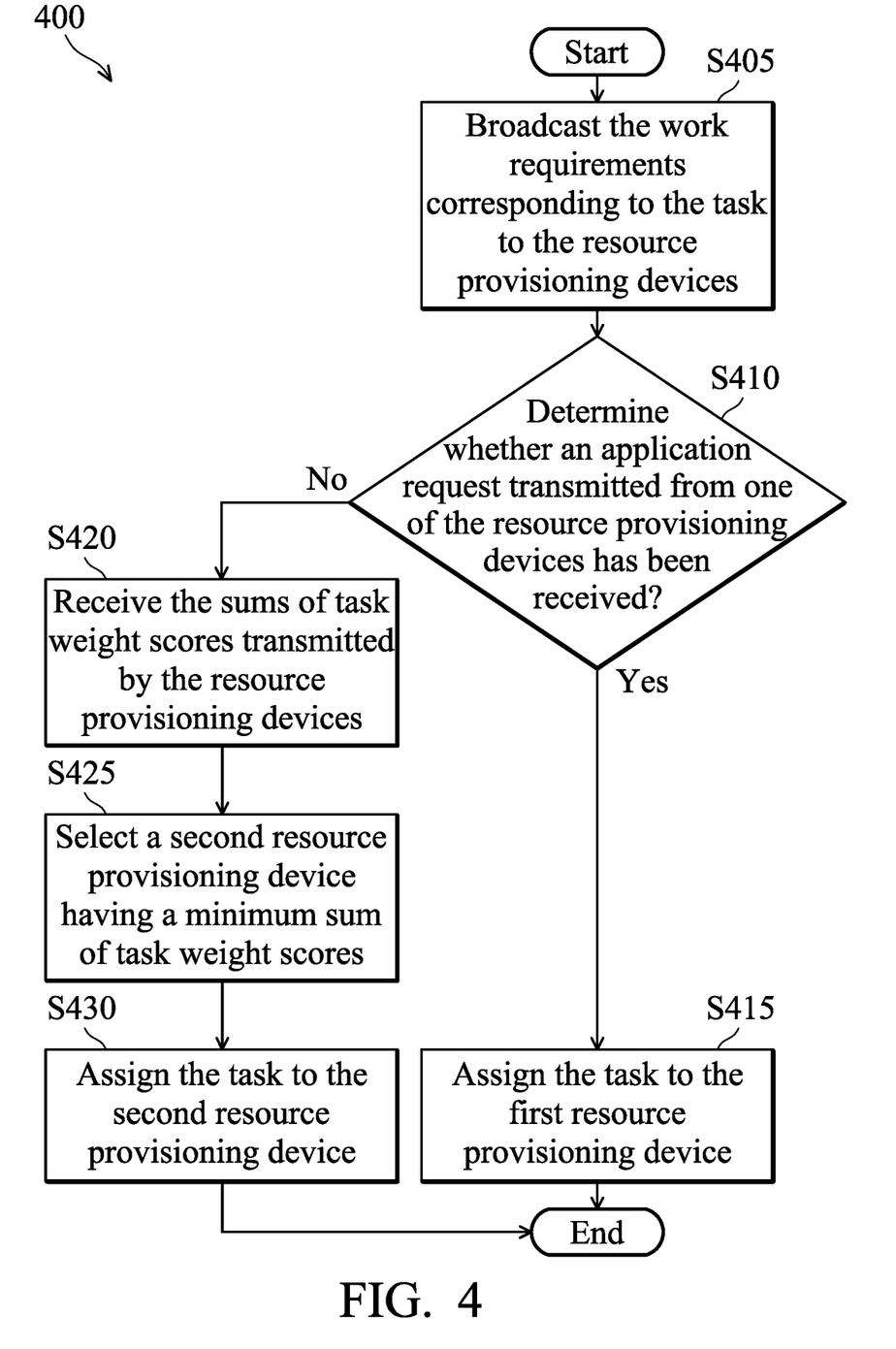
FIG. 4 is a flow diagram illustrating a method for dynamically assigning a task according to an embodiment of the disclosure.

FIG. 4 is a flow diagram 400 illustrating a method for dynamically assigning a task according to an embodiment of the disclosure. The method can be performed by the resource-management device 110 in the system 100 of FIG. 1, wherein the resource-management device 110 assigns a task to the resource provisioning devices.

Before the process begins, the resource-management device may receive a task uploaded by the user. In step S405, the resource-management device may broadcast the work requirements corresponding to the task to the resource provisioning devices. Next, in step S410, the resource-management device determines whether an application request transmitted from one of the resource provisioning devices has been received. When the resource-management device determines that the application request transmitted from a first resource provisioning device of the resource provisioning devices has been received ("Yes" in step S410), in step S415, the resource-management device assigns the task to the first resource provisioning device.

When the resource-management device determines that the resource-management device does not receive any application request from one of the resource provisioning devices ("No" in step S410), in step S420, the resource-management device receives the sums of task weight scores transmitted by the resource provisioning devices. In step S425, the resource-management device selects a second resource provisioning device having a minimum sum of task weight scores. In step S430, the resource-management device assigns the task to the second resource provisioning device.

Figure 5:
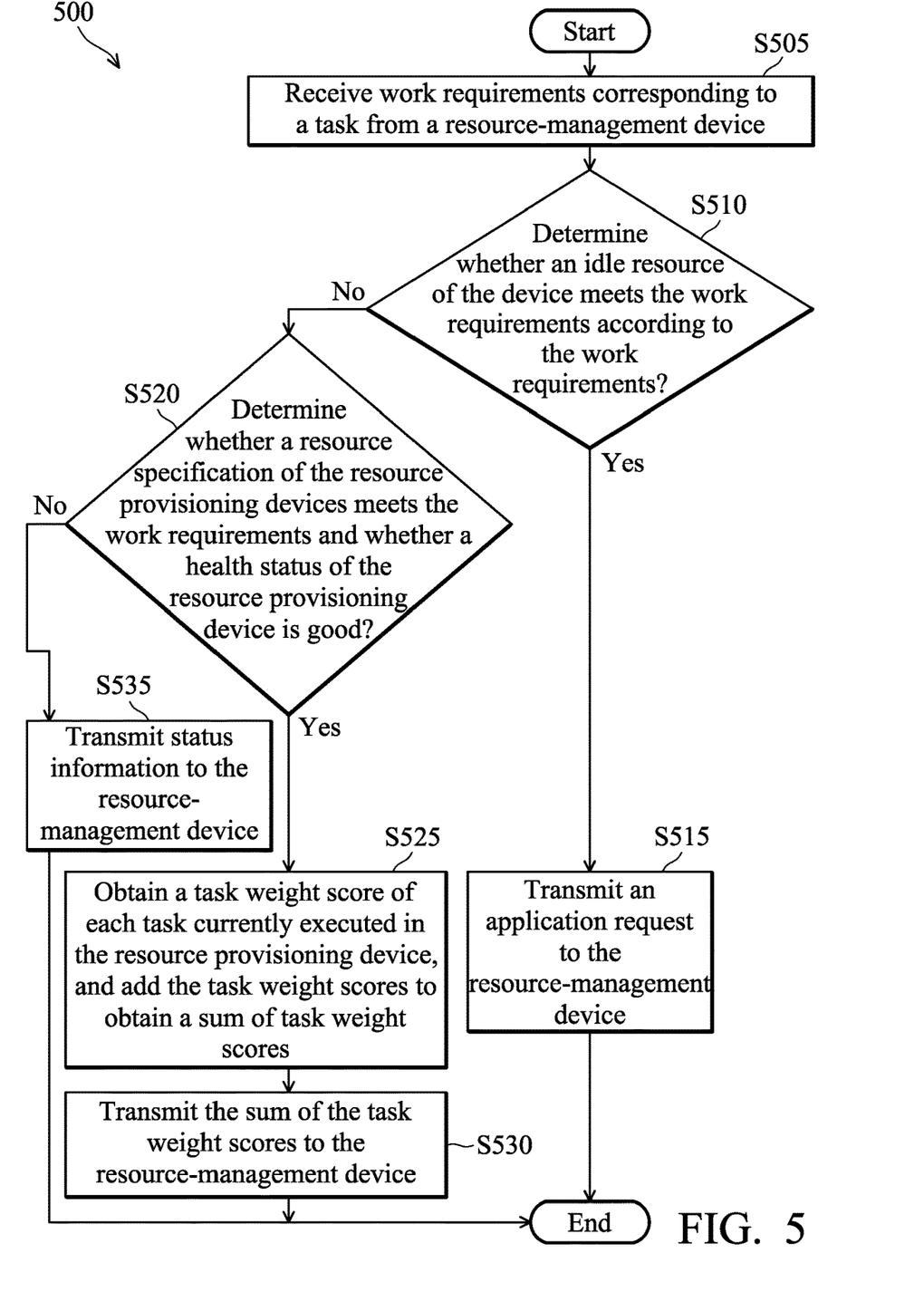
FIG. 5 is a flow diagram illustrating a method for dynamically providing resources according to an embodiment of the disclosure.

FIG. 5 is a flow diagram 500 illustrating a method for dynamically providing resources according to an embodiment of the disclosure. The method can be performed by one of the resource provisioning devices 120 in the system 100 of FIG. 1.

In step S505, the resource provisioning device receives work requirements corresponding to a task from a resource-management device, wherein the work requirements at least include the number of central processing units (CPUs), affinity between the CPU and a compute accelerator, number of compute accelerators, topology of compute accelerators, storage capacity, memory capacity, and task priority.

In step S510, the resource provisioning device determines whether an idle resource of the device meets the work requirements according to the work requirements. When the idle resource of the resource provisioning device meets the work requirements ("Yes" in step S510), in step S515, the resource provisioning device transmits an application request to the resource-management device.

When the idle resource of the resource provisioning device does not meet the work requirements ("No" in step S510), in step S520, the resource provisioning device determines whether a resource specification of the resource provisioning devices meets the work requirements and whether a health status of the resource provisioning device is good. When the resource specification of the resource provisioning device meets the work requirements and the health status is good ("Yes" in step S520), in step S525, the resource provisioning device obtains a task weight score of each task currently executed in the resource provisioning device, and adds the task weight scores to obtain a sum of task weight scores. In step S530, the resource provisioning device transmits the sum of the task weight scores to the resource-management device.

When the resource specification of the resource provisioning device does not meet the work requirements or the health status is not good ("No" in step S520), in step S535, the resource provisioning device transmits status information to the resource-management device. Such status information is used to notify the resource-management device that the resource specification of the resource provisioning device does not meet the work requirements, or that the health status of the resource provisioning device is not good. The resource-management device can then track and maintain the status of the resource provisioning device.

Figure 6:
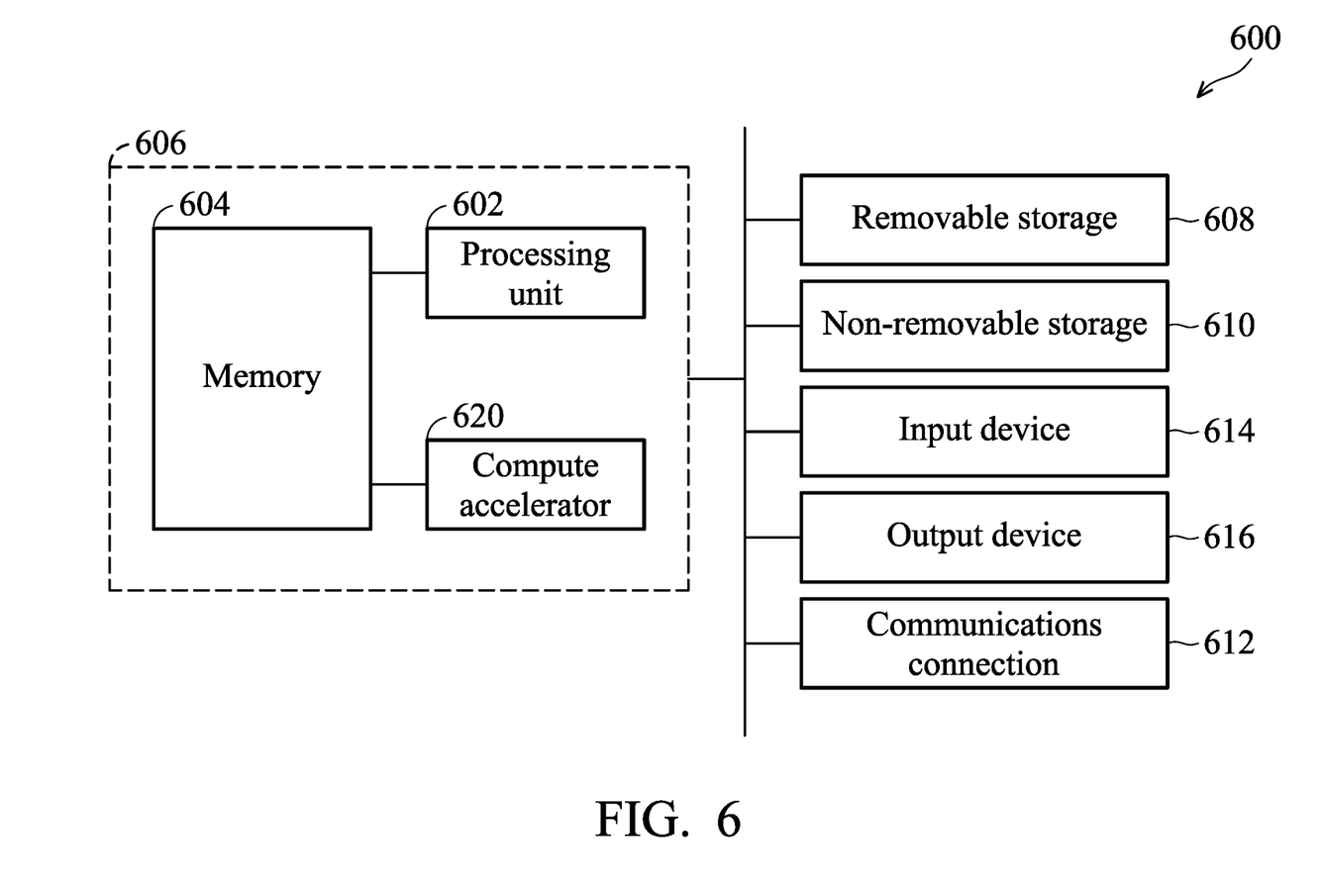
FIG. 6 is a flow diagram illustrating an exemplary operating environment according to an embodiment of the disclosure.

Having described embodiments of the present disclosure, an exemplary operating environment in which embodiments of the present disclosure may be implemented is described below. Referring to FIG. 6 in particular, an exemplary operating environment for implementing embodiments of the present disclosure is shown and designated generally as an electronic device 600. The electronic device 600 is but one example of a suitable computing environment and is not intended to suggest any limitation as to the scope of use or functionality of the disclosure. Neither should the electronic device 600 be interpreted as having any dependency or requirement relating to any one or combination of components illustrated.

As shown in FIG. 6, the electronic device 600 may be the resource-management device 110 or the resource provisioning devices 120 in the system 100 for dynamically assigns a task in FIG. 1. The following description is intended to provide a brief, general description of a suitable electrical device with which such a system can be implemented. The electrical device can be any of a variety of general purpose or special purpose computing hardware configurations. Examples of well-known electrical devices that may be suitable include, but are not limited to, game consoles, set top boxes, personal computers, hand-held or laptop devices (for example, media players, notebook computers, cellular phones, personal data assistants, voice recorders), server computers, multiprocessor systems, microprocessor-based systems, programmable consumer electronics, network PCs, minicomputers, mainframe computers, distributed computing environments that include any of the above systems or devices, and the like.

With reference to FIG. 6, an example electrical device 600, in a basic configuration, includes at least one processing unit 602 and a memory 604. The electrical device can have multiple processing units 602. A processing unit 602 can include one or more processing cores (not shown) that operate independently of each other. Additional co-processing units, such as compute accelerator 620, also are provided. Depending on the configuration and type of electrical device, the memory 604 may be volatile (such as RAM), non-volatile (such as ROM, flash memory, etc.) or some combination of the two. This configuration is illustrated in FIG. 6 by dashed line 606.

The electronic device 600 may have additional features and functionality. For example, the electronic device 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. The memory 604, the removable storage 608 and the non-removable storage 610 are all examples of computer storage media. The computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices. A storage medium is any medium in which data can be stored in and retrieved from addressable physical storage locations by the electronic device.

The electronic device 600 may also contain communications connection(s) 612 that allow the device to communicate with other devices over a communication medium. The communication media typically carry computer program instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The communications connections 612 are devices that interface with the communication media to transmit data over and receive data from communication media, such as a network interface.

The electronic device 600 may have various input device(s) 614 such as a keyboard, mouse, pen, camera, touch input device, and so on. Output device(s) 616 such as a display, speakers, a printer, and so on may also be included. All of these devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

Each component of this system that operates on an electrical device generally is implemented by software, such as one or more computer programs, which include computer-executable instructions and/or computer-interpreted instructions, such as program modules, being processed by the computer. Generally, program modules include routines, programs, objects, components, data structures, and so on, that, when processed by a processing unit, instruct the processing unit to perform particular tasks or implement particular abstract data types. This computer system may be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In addition, in the above exemplary device, although the method has been described on the basis of the flow diagram using a series of the steps or blocks, the present disclosure is not limited to the sequence of the steps, and some of the steps may be performed in order different from that of the remaining steps or may be performed simultaneously with the remaining steps. For example, the resource provisioning device may first determine whether the resource specification of the resource provisioning devices meets the work requirements and whether the health status of the resource provisioning devices is good, and then determines whether the idle resource of the resource provisioning device meets the work requirements according to the work requirements. Alternatively, the resource provisioning device may also simultaneously determine whether the idle resource of the resource provisioning device meets the work requirements, whether the resource specification of the resource provisioning devices meets the work requirements, and whether the health status of the resource provisioning devices is good. Furthermore, those skilled in the art will understand that the steps shown in the flow diagram are not exclusive and they may include other steps or one or more steps of the flow diagram may be deleted without affecting the scope of the present invention.

As described above, by using the method and device for dynamically assigning a task and dynamically providing resources and a system thereof provided in the present disclosure, the resource-management device does not need to monitor the status of each resource provisioning device, and only needs to propose the work requirements, so that the resource-management device may assign the task automatically according to the respective status and the task weight scores provided by the resource provisioning devices. The operational burden of the resource-management device can be reduced, and the efficiency of assigning the task is increased.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for dynamically assigning a task, comprising:
broadcasting work requirements corresponding to the task to a plurality of resource provisioning devices;
determining whether an application request transmitted from one of the resource provisioning devices has been received; and
assigning the task to a first resource provisioning device of the resource provisioning devices when receiving the application request transmitted from the first resource provisioning device,
wherein the method further comprises:
receiving sums of task weight scores transmitted by the resource provisioning devices when determining that an application request has not been received from one of the resource provisioning devices;
selecting a second resource provisioning device having a minimum sum of task weight scores; and
assigning the task to the second resource provisioning device,
wherein the sums of task weight scores is obtained by adding task weight scores of the tasks currently executed in each resource provisioning device, the task weight score of each task includes only the values of properties that relate to each task, and the task weight score of each task is expressed as follows:

task weight score=priority×amount of data wherein the priority of each task is assigned by the resource-management device, and the amount of data is the amount of data used in each task executed by each resource provisioning device.

2. A device for dynamically assigning a task, comprising:
a processor; and
a memory, operatively coupled to the processor;
wherein the processor is configured to execute a program code stored in the memory to:
broadcast work requirements corresponding to the task to a plurality of resource provisioning devices;
determine whether an application request transmitted from one of the resource provisioning devices has been received; and
assign the task to a first resource provisioning device of the resource provisioning devices when receiving the application request transmitted from the first resource provisioning device,
wherein the processor further executes the program code stored in the memory to:
receive sums of task weight scores transmitted by the resource provisioning devices when determining that an application request has not been received from one of the resource provisioning devices;
select a second resource provisioning device having a minimum sum of task weight scores; and
assign the task to the second resource provisioning device,
wherein the sums of task weight scores is obtained by adding task weight scores of the tasks currently executed in each resource provisioning device, the task weight score of each task includes only the values of properties that relate to each task, and the task weight score of each task is expressed as follows:

task weight score=priority×amount of data wherein the priority of each task is assigned by the device, and the amount of data is the amount of data used in each task executed by each resource provisioning device.

3. A method for dynamically providing resources, used in a device, comprising:
receiving work requirements corresponding to a task from a resource-management device;
determining whether an idle resource of the device meets the work requirements according to the work requirements;
transmitting an application request to the resource-management device when the idle resource of the device meets the work requirements;
determining whether a resource specification of the device meets the work requirements and whether a health status of the device is good when the idle resource of the device does not meet the work requirements;
obtaining a task weight score of each task currently executed in the device, and adding the task weight scores to obtain a sum of task weight scores when the resource specification meets the work requirements and the health status is good; and
transmitting the sum of the task weight scores to the resource-management device,
wherein the task weight score of each task includes only the values of properties that relate to each task, and the task weight score of each task is expressed as follows:

task weight score=priority×amount of data wherein the priority of each task is assigned by the resource-management device, and the amount of data is the amount of data used in each task executed by the device.

4. The method for dynamically providing resources as claimed in claim 3, wherein the work requirements at least include the number of central processing units (CPUs), an affinity between the CPU and a compute accelerator, a number of compute accelerators, a topology of compute accelerators, a storage capacity, and a memory capacity.

5. A device for dynamically providing resources, comprising:
a processor; and
a memory, operatively coupled to the processor;
wherein the processor is configured to execute a program code stored in the memory to:
receive work requirements corresponding to a task from a resource-management device;
determine whether an idle resource of the device meets the work requirements;
transmit an application request to the resource-management device when the idle resource of the device meets the work requirements;
determine whether a resource specification of the device meets the work requirements and whether a health status of the device is good when the idle resource of the device does not meet the work requirements;

obtain a task weight score of each task currently executed in the device, and add the task weight scores to obtain a sum of task weight scores when the resource specification meets the work requirements and the health status is good; and transmit the sum of the task weight scores to the resource-management device, wherein the task weight score of each task includes only the values of properties that relate to each task, and the task weight score of each task is expressed as follows:

$$\text{task weight score} = \text{priority} \times \text{amount of data}$$

wherein the priority of each task is assigned by the resource-management device, and the amount of data is the amount of data used in each task executed by the device.

6. The device for dynamically providing resources as claimed in claim 5, wherein the work requirements at least include the number of central processing units (CPUs), an affinity between the CPU and a compute accelerator, a number of compute accelerators, a topology of compute accelerators, a storage capacity and a memory capacity.

* * * * *